US012594669B2

(12) United States Patent
Yamamoto

(10) Patent No.: US 12,594,669 B2
(45) Date of Patent: Apr. 7, 2026

(54) ROBOT CONTROL METHOD, ROBOT CONTROL SYSTEM, AND COMPUTER READABLE MEDIUM

(71) Applicant: TOYOTA JIDOSHA KABUSHIKI KAISHA, Toyota (JP)

(72) Inventor: Kazuya Yamamoto, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 166 days.

(21) Appl. No.: 18/462,583

(22) Filed: Sep. 7, 2023

(65) Prior Publication Data

US 2024/0123613 A1    Apr. 18, 2024

(30) Foreign Application Priority Data

Oct. 5, 2022    (JP) ................................. 2022-160704

(51) Int. Cl.
| | |
|---|---|
| *B25J 9/16* | (2006.01) |
| *B25J 3/00* | (2006.01) |
| *B62D 57/032* | (2006.01) |

(52) U.S. Cl.
CPC ................. *B25J 9/162* (2013.01); *B25J 3/00* (2013.01); *B25J 9/1602* (2013.01); *B25J 9/1653* (2013.01);
(Continued)

(58) Field of Classification Search
CPC ... B25J 9/162; B25J 3/00; B25J 6/1653; B25J 9/1664; B25J 9/1602; B25J 11/00; B25J 9/1653; B62D 57/032; G05B 2219/40264
(Continued)

(56) References Cited

U.S. PATENT DOCUMENTS

2012/0143374 A1 * 6/2012 Mistry ................. B62D 57/032
                                                    901/47
2015/0202768 A1 * 7/2015 Moridaira ............ B62D 57/032
                                                    901/1
(Continued)

FOREIGN PATENT DOCUMENTS

JP          2021-160061 A      10/2021

OTHER PUBLICATIONS

S. Kajita et al., "Biped walking pattern generation by using preview control of zero-moment point," 2003 IEEE International Conference on Robotics and Automation (Cat. No. 03CH37422), Taipei, Taiwan, 2003, pp. 1620-1626 vol. 2, doi: 10.1109/ROBOT.2003. 1241826. (Year: 2003).*

*Primary Examiner* — Jason Holloway
*Assistant Examiner* — Alexandra R. Morford
(74) *Attorney, Agent, or Firm* — OLIFF PLC

(57)            ABSTRACT

Pilot posture information indicating a posture of a pilot is input, and action control is executed on a bipedal robot capable of switching modes between a walk mode and a stand mode based on the pilot posture information. The above action control includes stand transition control, the stand transition control including calculating reference posture information indicating a reference posture of the bipedal robot based on initial posture information indicating an initial posture of the bipedal robot corresponding to an initial posture of the pilot and foot position information indicating current foot positions of the bipedal robot, and controlling a posture of the bipedal robot based on the pilot posture information and the calculated reference posture information when the modes are switched from the walk mode to the stand mode.

3 Claims, 6 Drawing Sheets

1

(52) U.S. Cl.
CPC ........... *B25J 9/1664* (2013.01); *B62D 57/032*
(2013.01); *G05B 2219/40264* (2013.01)

(58) Field of Classification Search
USPC ................................................ 700/245–264
See application file for complete search history.

(56) References Cited

U.S. PATENT DOCUMENTS

| | | | |
|---|---|---|---|
| 2017/0129105 A1* | 5/2017 | Stephens, Jr. .......... | B25J 9/1689 |
| 2021/0200311 A1* | 7/2021 | Kerber ................... | G06F 3/011 |
| 2022/0305654 A1* | 9/2022 | Ishizuka ................ | B25J 19/023 |
| 2022/0306564 A1* | 9/2022 | Kelly ..................... | A61P 21/00 |

* cited by examiner

1

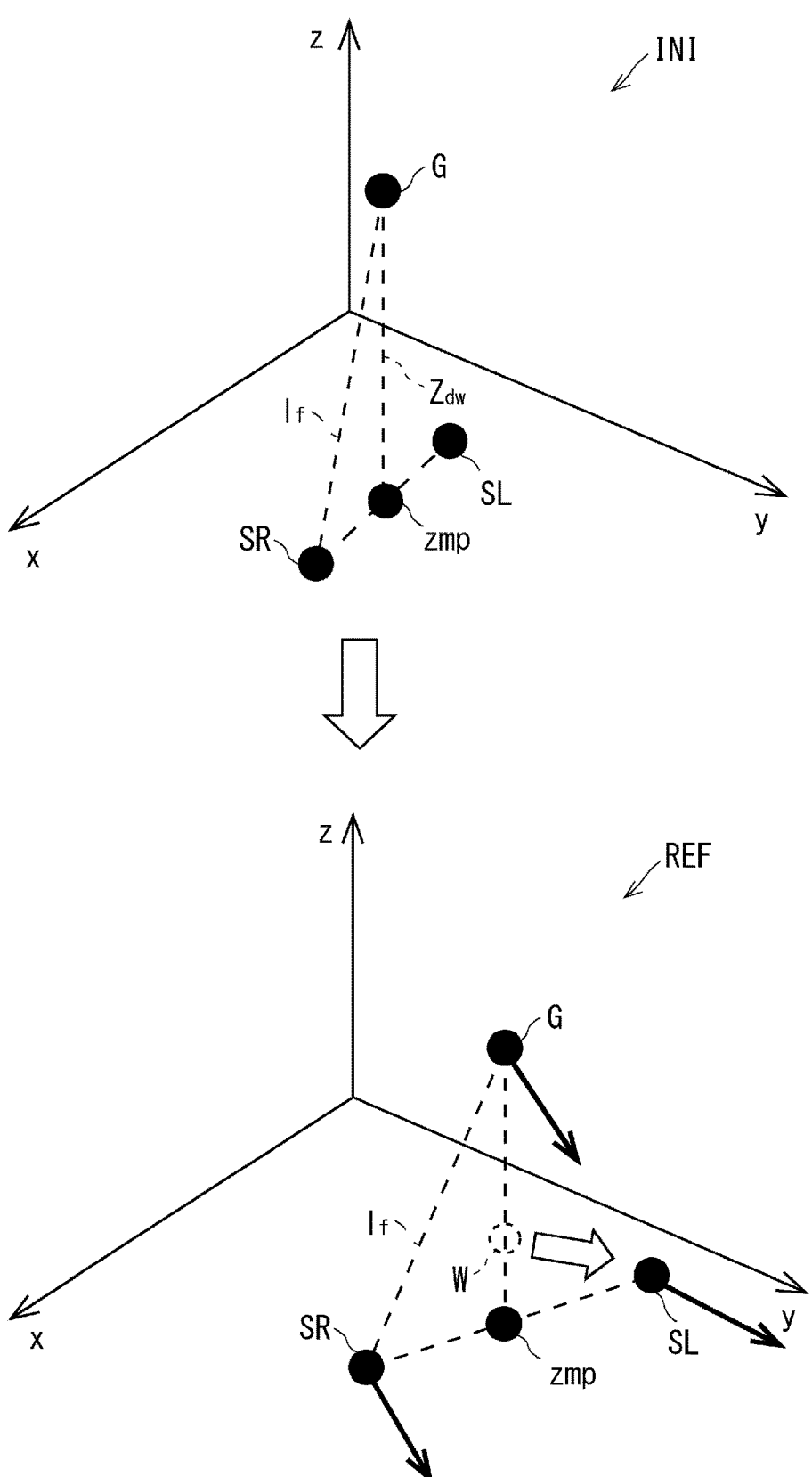
F i g.  5

6/6

ROBOT CONTROL METHOD, ROBOT CONTROL SYSTEM, AND COMPUTER READABLE MEDIUM

CROSS REFERENCE TO RELATED APPLICATIONS

This application is based upon and claims the benefit of priority from Japanese patent application No. 2022-160704, filed on Oct. 5, 2022, the disclosure of which is incorporated herein in its entirety by reference.

BACKGROUND

The present disclosure relates to a robot control method, a robot control system, and a program.

Japanese Unexamined Patent Application Publication No. 2021-160061 describes a remote control system for the purpose of making an operated object perform flexible and stable high-speed operations that are difficult to achieve only by autonomous control that maintains the operated object's standing posture.

The remote control system described in Japanese Unexamined Patent Application Publication No. 2021-160061 includes an operated object having a mechanism that enables a predetermined part to be operated by remote control of an operator, a motion detection apparatus that detects an action status of the operator's body, a stimulus presentation apparatus that operates to present a stimulus to the operator, and a control apparatus that performs action control of the operated object and the stimulus presentation apparatus. Here, the operated object has a human body simulated shape including parts corresponding to arms, a trunk, and legs of a human body, and parts corresponding to the legs are provided with feet that touch a predetermined ground surface in a standing state. Also, operations of the stimulus presentation apparatus are controlled so that pressure stimulation is given to the parts of the soles of the operator's feet corresponding to the parts where the ground pressure is applied, which the ground pressure becomes a reaction force the feet receive due to the feet touching the ground, as sole force sensation information according to a magnitude of the ground pressure. Then, after the presentation of the pressure stimulation, actions of the parts of the operated object corresponding to the arms and trunk are controlled to follow the actions of the operator's arms and trunk, respectively, based on a result of the detection by the action detection apparatus.

SUMMARY

Thus, in the technique described in Japanese Unexamined Patent Application Publication No. 2021-160061, pressure stimulation is presented to the operator to allow the operator to avoid falling. However, in the technique described in Japanese Unexamined Patent Application Publication No. 2021-160061, although the manipulation of the waist position and walking seem to be achieved in real time since the operator always indicates the whole body posture of the operated object including the legs, in reality, it is difficult for the operator to walk while receiving the pressure stimulation as feedback, and thus walking stability is lacking. Therefore, it is desirable to improve walking stability of a bipedal robot. In particular, since a bipedal robot is easy to fall when transitioning from walking to standing on both legs, control to improve walking stability in such a case is desirable.

The present disclosure has been made in order to solve such a problem, and an object thereof is to provide a robot control method, a robot control system, and a program that can improve walking stability when transitioning from walking to standing on both legs when a bipedal robot is controlled according to a posture of a pilot.

A robot control method according to an aspect of the present disclosure includes: inputting pilot posture information indicating a posture of a pilot; and executing action control of a bipedal robot capable of switching modes between a walk mode and a stand mode based on the pilot posture information. The action control includes stand transition control, the stand transition control including calculating reference posture information indicating a reference posture of the bipedal robot based on initial posture information indicating an initial posture of the bipedal robot corresponding to an initial posture of the pilot and foot position information indicating current foot positions of the bipedal robot, and controlling a posture of the bipedal robot based on the pilot posture information and the calculated reference posture information when the modes are switched from the walk mode to the stand mode.

A robot control system according to another aspect of the present disclosure includes: an input unit configured to input pilot posture information indicating a posture of a pilot; and a control unit configured to execute action control of a bipedal robot capable of switching modes between a walk mode and a stand mode based on the pilot posture information. The control unit is configured to calculate reference posture information indicating a reference posture of the bipedal robot based on initial posture information indicating an initial posture of the bipedal robot corresponding to an initial posture of the pilot and foot position information indicating current foot positions of the bipedal robot, and control a posture of the bipedal robot based on the pilot posture information and the calculated reference posture information when the modes are switched from the walk mode to the stand mode.

A program according to another aspect of the present disclosure causes a computer to execute robot control including: inputting pilot posture information indicating a posture of a pilot; and executing action control of a bipedal robot capable of switching modes between a walk mode and a stand mode based on the pilot posture information. The action control includes stand transition control, the stand transition control including calculating reference posture information indicating a reference posture of the bipedal robot based on initial posture information indicating an initial posture of the bipedal robot corresponding to an initial posture of the pilot and foot position information indicating current foot positions of the bipedal robot, and controlling a posture of the bipedal robot based on the pilot posture information and the calculated reference posture information when the modes are switched from the walk mode to the stand mode.

According to any of the above robot control method, the above robot control system, and the above program, it is possible to improve walking stability when transitioning from walking to standing on both legs when a bipedal robot is controlled according to a posture of a pilot.

According to the present disclosure, it is possible to provide a robot control method, a robot control system, and a program that can improve walking stability when transitioning from walking to standing on both legs when a bipedal robot is controlled according to a posture of a pilot.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 5 is a schematic diagram for explaining posture information that can be used in the robot control method of FIGS. 3 and 4.

DESCRIPTION OF EMBODIMENTS

The present disclosure is described below through the embodiment of the disclosure, but the disclosure in the claims is not limited to the following embodiment. Moreover, not all of the configurations described in the embodiment are essential as means to solve the problem.

Embodiment

Figure 1:
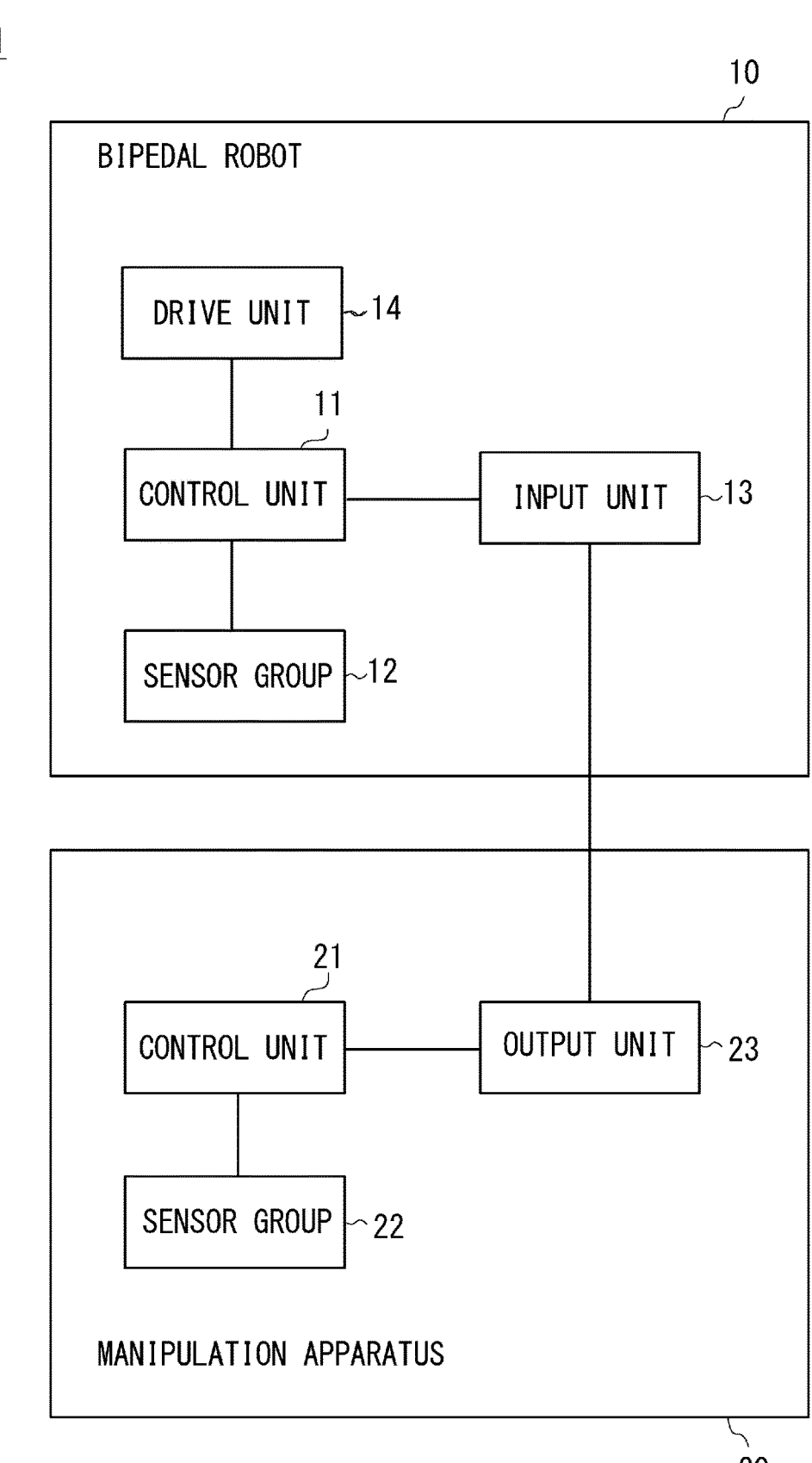
FIG. 1 is a block diagram showing an example of a configuration of a robot control system according to an embodiment.
Figure 2:
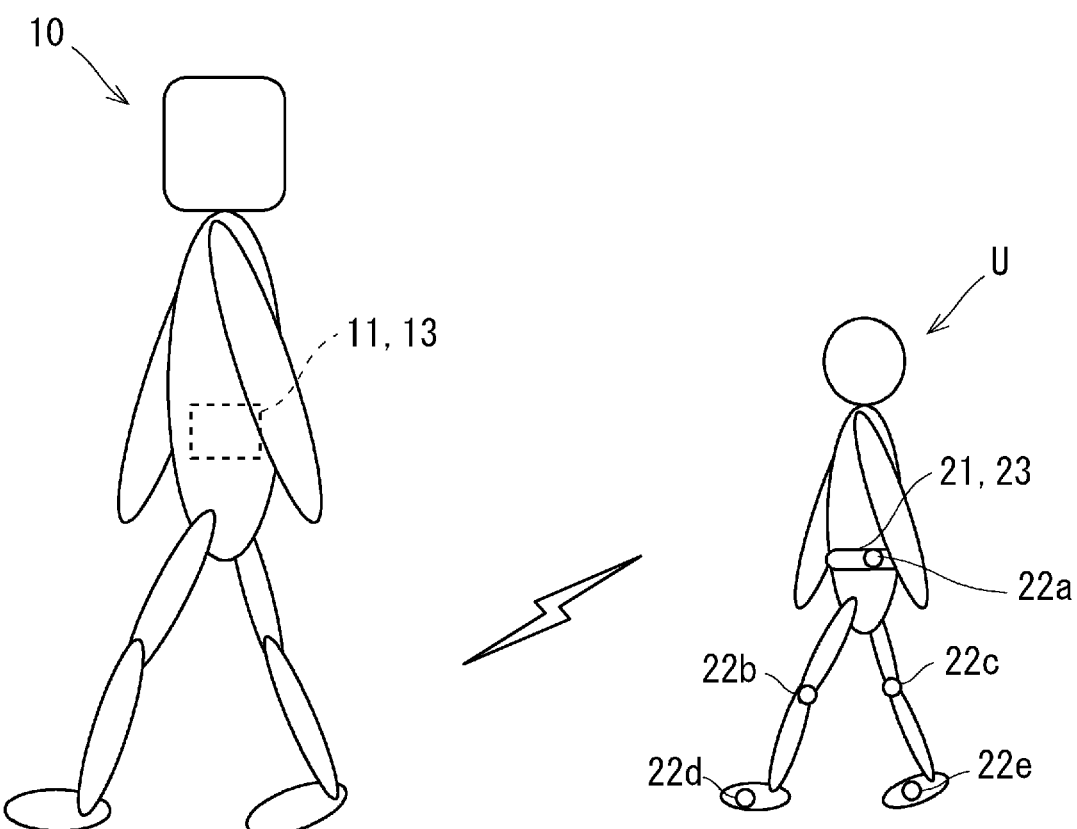
FIG. 2 is a schematic diagram showing an appearance of the robot control system of FIG. 1.

FIG. 1 is a block diagram showing a configuration example of a robot control system according to this embodiment, and FIG. 2 is a schematic diagram showing an appearance of the robot control system in FIG. 1. As shown in FIGS. 1 and 2, the robot control system 1 according to this embodiment can include a bipedal robot (hereafter referred to simply as a robot) 10 and a manipulation apparatus 20.

The robot 10 only needs to be a robot that can walk on two legs and can switch modes between a walk mode and a stand mode, and a robot that can be manipulated by the manipulation apparatus 20 to replicate actions of a pilot U. For example, as shown in FIG. 2, the robot 10 can be a humanoid robot with a configuration close to a human body with a waist above legs, and arms and a head. However, the present disclosure is not limited to this, and, for example, arms and head need not be fully equipped. The stand mode refers to a mode in which the robot 10 stands on both legs, i.e., a both-leg stand mode. The stand mode and the walk mode can, for example, be modes that differ from each other mainly in a target center of gravity posture and a target waist angle.

The bipedal robot 10 can include a control unit 11, a sensor group 12, an input unit 13, and a drive unit 14. The manipulation apparatus 20 is for the pilot U to manipulate (operate) actions of, for example, a waist posture of the robot 10, and can include a control unit 21, a sensor group 22, and an output unit 23.

The control unit 11 may be a part that performs action control of the robot 10, and can also be a part that controls the whole of the robot 10. The control unit 11 can be implemented by, for example, an integrated circuit such as a processor including an MPU (Micro Processor Unit) or a CPU (Central Processing Unit), a working memory, and a non-volatile storage apparatus. This storage apparatus stores a control program executed by the processor, and the processor reads the program into the working memory and executes it, thereby performing the functions of the robot 10.

The sensor group 12 is composed of a plurality of sensors that detect the various positions, angles, etc. of the robot 10 and pass them to the control unit 11. Any type of sensor may be used as long as the posture of the robot 10 can be detected directly or by calculation using the sensor group 12. The sensors included in the sensor group 12 can be arranged at positions that respectively correspond to the sensors in the sensor group 22, although an example is omitted in FIG. 2. However, only some of the sensors included in the sensor group 12 can be arranged at the corresponding positions, or none of the sensors can be arranged at the corresponding position. The sensors included in the sensor group 12 need only be able to obtain various information for the action as described later by calculation.

The input unit 13 inputs information about the manipulation from the manipulation apparatus 20 and passes it to the control unit 11. The information input to the input unit 13 includes pilot posture information which indicates a posture of the pilot U. The pilot posture information can be the information which indicates the posture of the pilot U itself, but it can also be the information which indicates a displacement of various parts of the pilot U such as the foot and the waist. Based on the pilot posture information, the control unit 11 can execute action control on the robot 10 with reference also to the information about the posture of the robot 10 detected by the sensor group 12. This action control will include control on the posture of the robot 10. The positions of the control unit 11 and the input unit 13 shown in FIG. 2 are examples only.

The drive unit 14 is a part for driving moving parts arranged at various places in the robot 10 and can include motors and the like provided at various places. The drive unit 14 can change the posture of the robot 10 by moving the moving parts arranged at various places according to the control from the control unit 11. The control unit 21 is a part that controls the entire manipulation apparatus 20 and can employ a configuration similar to, for example, the control unit 11, but a program for controlling is for performing the function of the manipulation apparatus 20.

The sensor group 22 is composed of a plurality of sensors that detect the various positions, angles, etc. of the pilot U and pass them to the control unit 21. Any type of sensor may be used as long as the posture of the pilot U can be detected directly or by calculation using the sensor group 22 and the movements of the pilot U can be tracked. The position where each sensor of the sensor group 22 is mounted can include the waist and the sole of the pilot U, or can be placed at more joints. For example, the manipulation apparatus 20 may include, as the sensor group 22, sensors 22a to 22e that the pilot U has worn at various places such as the sole, the knees, and the waist, as shown in FIG. 2. The position at which each sensor is attached will differ depending on the range and accuracy to which the actions are to be reflected to the robot 10.

In addition, although a detailed description is omitted, the sensor group 22 or some sensors included in the sensor group 22 may not be worn by the pilot U, and for example, the sensor may be composed of a camera that captures moving images of the pilot U or still images of the pilot U at predetermined intervals, and an analysis apparatus that analyzes the captured image data and performs motion tracking. In this way, the manipulation apparatus 20 can include a motion capture apparatus that can acquire the position and angle of each position of the pilot U. The motion capture apparatus is not limited to using method in which the pilot U wears the sensor group 22 as exemplified here, and instead can use any method as long as movements of the pilot U can be acquired, such as the method for estimating the movements from camera images. Each position of the pilot U can refer to each joint of the pilot U. Also, only the position of each joint can be acquired and the angle can be acquired by inverse kinematics calculation.

The control unit 21 obtains the pilot posture information, which is information to be transmitted to the robot 10 side, such as by generating from information about the posture of the pilot U detected by the sensor group 22, and passes it to output unit 23. The output unit 23 issues a walking command by outputting the pilot posture information received from the control unit 21 to the robot 10, that is, to the input unit 13. Although FIG. 2 shows an example in which the control unit 21 and the output unit 23 are mounted on a belt to which the waist sensor 22a is mounted, these arrangements are not limited to the example.

In this way, the manipulation apparatus 20 can be a controller for outputting, to the robot 10, a walking command indicated by the pilot posture information, and may be, for example, a shoe-shaped controller, a foot pedal, or a hand-operated controller. The walking command may include commands such as the stepping foot of the walk, the width of the step, and the orientation.

Note that both the input unit 13 and the output unit 23 may be wired or wireless communication units. The manipulation apparatus 20 may be configured in such a way that the control unit 21 is omitted, and the output unit 23 outputs the detection result in the sensor group 22 as is to the robot 10.

The robot control system 1 according to this embodiment has the following features. Specifically, when the mode is switched from the walk mode to the stand mode, the control unit 11 calculates reference posture information indicating a reference posture of the robot 10 based on the initial posture information about the robot 10 and the current foot position information about the robot 10. The initial posture information about the robot 10 described above indicates an initial posture of the robot 10 corresponding to the initial posture of the pilot U. The current foot position information about the robot 10 described above indicates the current positions of the feet of the robot 10, which can be acquired by the sensor group 12 or from a last control value.

The control unit 11 then controls the posture of the robot 10 based on the calculated reference posture information and the input pilot posture information. Of course, the pilot posture information used here can be current information, that is, up-to-date information. It should be noted that the position, angle, etc. of the feet, waist, etc. of the robot 10 or the pilot U can be information indicating the position, angle, etc. relative to a certain reference. Also, the control when the mode is switched from the walk mode to the stand mode can be referred to as stand transition control.

Figure 3:
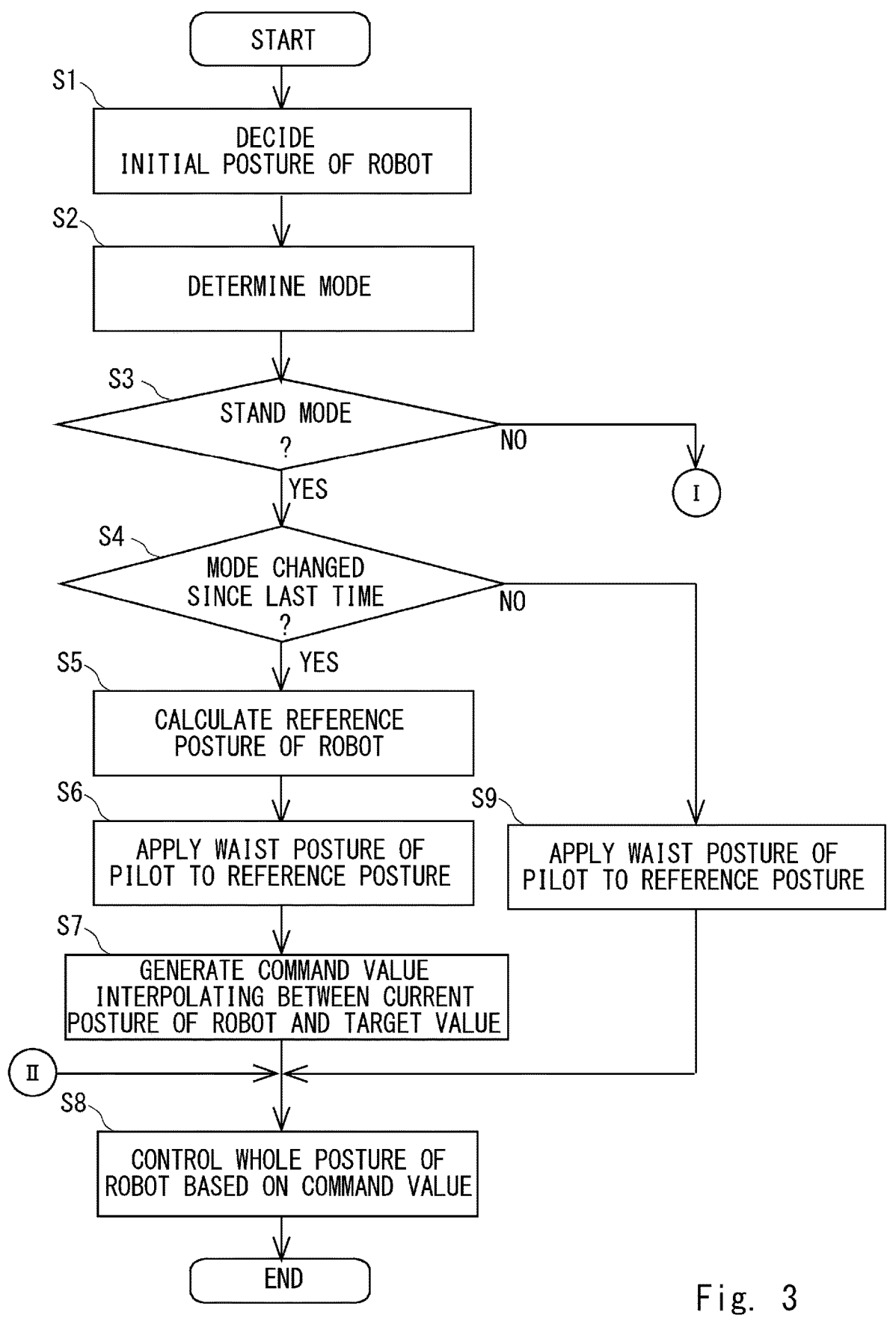
FIG. 3 is a flowchart for explaining an example of a robot control method in the robot control system in FIG. 1.
Figure 4:
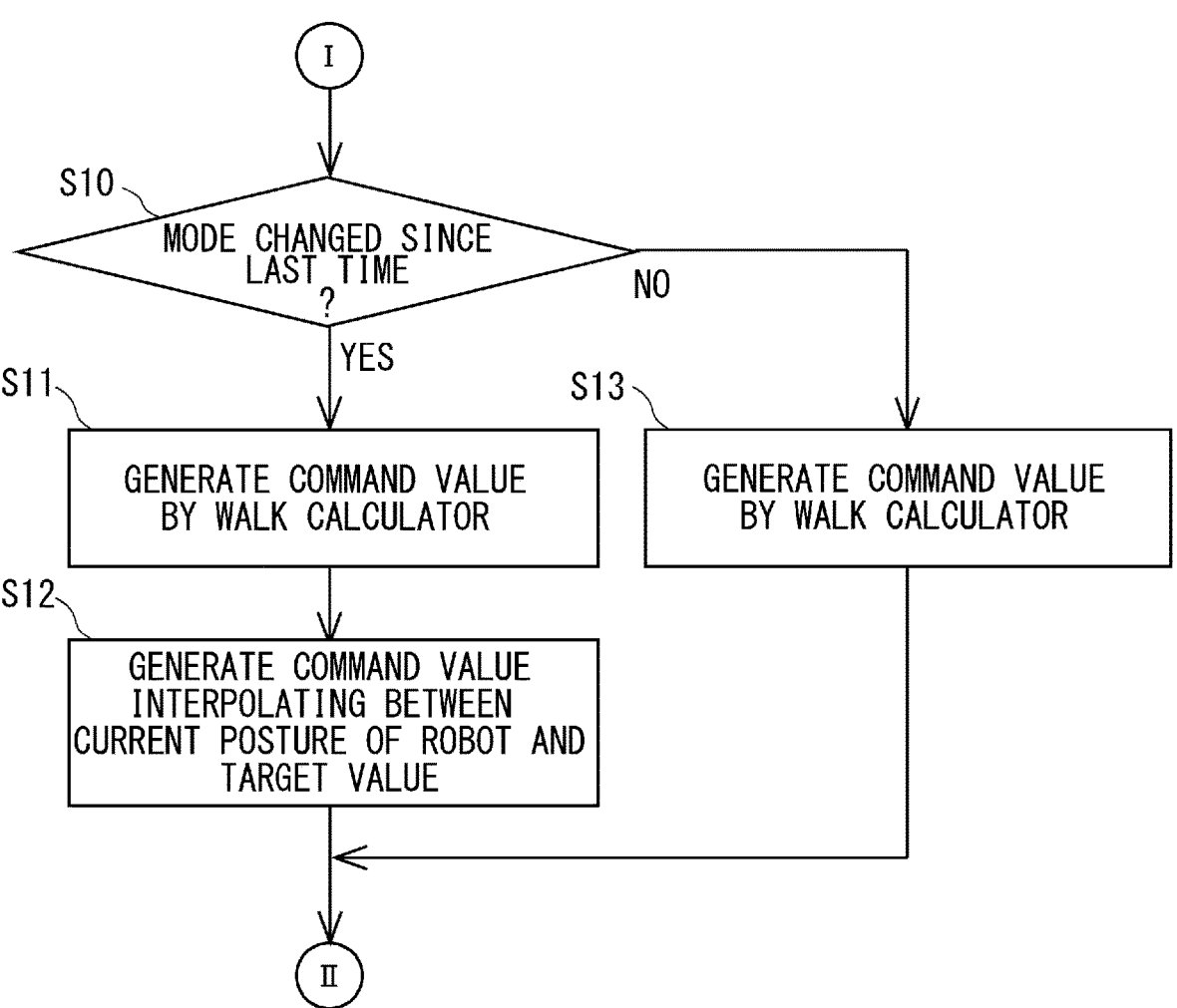
FIG. 4 is a flowchart following FIG. 3.
Figure 6:
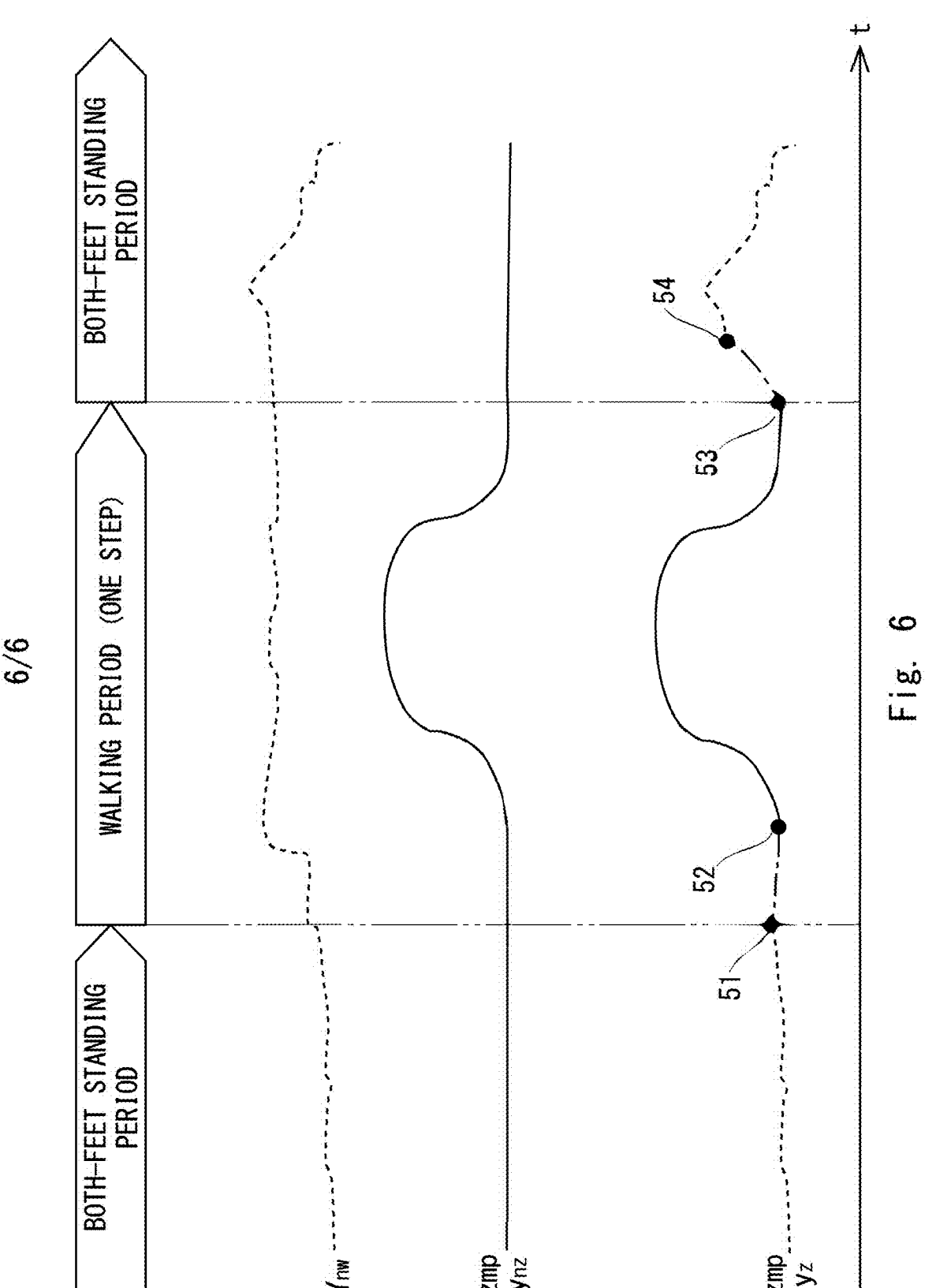
FIG. 6 is a schematic diagram for explaining an example of interpolation processing in the robot control method of FIGS. 3 and 4.

Next, an example of the robot control method in the robot control system 1 will be described with reference to FIGS. 3 to 6. FIG. 3 is a flowchart for explaining an example of the robot control method in the robot control system 1, and FIG. 4 is a flowchart following FIG. 3. FIG. 5 is a schematic diagram for explaining posture information that can be used with the robot control method in FIGS. 3 and 4, and FIG. 6 is a schematic diagram for explaining an example of interpolation processing in the robot control method.

In the robot control system 1, the initial posture of the robot 10 is first decided (Step S1). This decision may be made, for example, as follows. At the start of the manipulation or before the start of the manipulation, the manipulation apparatus 20 measures the position $(X_{dw}, Y_{dw}, Z_{dw})$ and angle $(A_{dw}, B_{dw}, \Gamma_{dw})$ of the pilot U's waist. At this time, in order to set the initial posture of the robot 10 described below, it is recommended to measure the position $(X_{dw}, Y_{dw}, Z_{dw})$ and angle $(A_{dw}, B_{dw}, \Gamma_{dw})$ of the waist with the knees bent so that the pilot U can relax and move his/her legs comfortably without being constrained by the waist position. The manipulation apparatus 20 outputs the measured result to the robot 10 as the pilot initial posture information indicating the initial posture.

In the robot 10, this pilot initial posture information is input and the initial posture information indicating the initial posture of the robot 10 corresponding to this pilot initial posture information is set. The initial posture information to be set can be an initial sole position (left sole SL position $(x_{dl}, y_{dl}, z_{dl})$, right sole SR position $(x_{dr}, y_{dr}, z_{dr})$), and the height $z_{dw}$ of the initial center of gravity G, as exemplified by INI in FIG. 5. In Step S1, the initial posture of the robot 10 can thus be predetermined before the action control. It should be noted that the information (parameters) included in the initial pilot posture information and the information (parameters) included in the initial posture information of the robot 10 corresponding to the pilot posture information are the information indicating the posture of the waist and the information indicating the position and orientation of the center of gravity, respectively, and although they are not the information about the same positions, since the relationship between the waist and the center of gravity is known, it can be said that they correspond to each other.

The initial posture information is described with reference to INI in FIG. 5. First, the reference position of the right sole SR and the reference position of the left sole SL are determined in advance, and the xy coordinate of the reference position of the zero moment point (zmp) is defined as a midpoint on that xy plane. The height $Z_{dw}$ of the center of gravity G in the initial posture is set so that the distance $l_f$ from the right sole SR to the center of gravity G or the distance from the left sole SL to the center of gravity G (which is the distance $l_f$ for the purpose of being symmetric in the initial posture) is shorter than the original leg length. When the right sole SR is used as an example, the length of the leg itself of the robot 10 can be defined as the distance from the right sole SR to the waist when the leg is extended, and the distance $l_f$ being shorter than the original leg length means that the distance from the right sole SR to the waist is shorter than the distance from the right sole SR to the waist when the leg is extended. Specifically, when the distance $l_f$ from the right sole SR to the center of gravity G is shorter than the original leg length, the knee or the part of the leg corresponding to the knee is slightly bent. The same applies to the left sole SL.

The initial posture information can thus be set. Since the height $Z_{dw}$ of the center of gravity G is set when the knee or the part corresponding to the knee of the robot 10 is bent as described above, the initial posture can be a posture with a margin that allows the robot 10 to perform imitation control by the movement of the waist even when an external force is applied to it.

Following Step S1, the control unit 11 determines whether or not to switch modes. There are several possible examples of the determination regarding mode switching. An example, when the mode is switched automatically, the determination can be made based on whether or not the mode has been switched. In the case of the stand mode, the mode can be switched to the walk mode by a new instruction from the pilot U to walk, and in this case, it can be determined that the mode has been switched from the stand mode to the walk mode by accepting the instruction to walk. In the case of the walk mode, if a condition is satisfied such that there is no instruction to walk for a certain period of time after the end of walking, the mode can be switched to the stand mode, and in this case, it can be determined that the mode has been switched from the walk mode to the stand mode if the above condition is satisfied. In addition to this, the mode may be switched between the walk mode and the stand mode based on an operation such as a manual switch or the like provided on the manipulation apparatus 20.

In this way, the mode switching can be performed according to a switch instruction which is at least one of the walking instruction or the stand instruction indicated by the pilot posture information and the instruction based on the switching operation by the pilot U. Then, the switching from the walk mode to the stand mode can be performed even if there is no switch instruction indicating walking for a predetermined period of time after the end of walking in the walk mode. The mode can be switched from the stand mode to the walk mode based on at least one of the stand instruction indicated by the pilot posture information and the switch operation by the pilot U.

In the examples of FIGS. 3 and 4, following Step S1, the control unit 11 first determines the mode (Step S2), and when the determination result indicates the stand mode (YES in Step 3), the control unit 11 determines whether or not the mode has been changed since the last time (Step S4). Also when the determination result indicates the walk mode (NO in Step S3), the control unit 11 determines whether or not the mode has been changed since the last time (Step S10). Whether the mode has been changed since the last time can be determined by storing the last determination result and then referring to it.

If the mode is the walk mode and the mode has been changed since the last time (YES in Step S10), a command value of the position of the center of gravity and the waist angle, which is the target value for achieving the instructed walking stably, is generated on a walk calculator side in real time (Step S11), and a command value that interpolates the current posture of the robot 10 and the target value is generated (Step S12). If the mode is the walk mode and the mode has changed since the last time (NO in Step S10), a command value of the position of the center of gravity and the waist angle, which is the target value for achieving the instructed walking stably, is generated on the walk calculator side in real time (Step S13). Existing techniques can be used for the processing of Steps S11 and S13. The processing of Step S12 is similar to the processing Step S7 described later.

If the mode is the stand mode and the mode has been changed since the last time (YES in Step S4), the control unit 11 calculates the reference posture of the robot 10 (Step S5). As can be seen from the determination in Step S4, the processing of Step S5 is executed only for the first time after the transition to the stand mode. In Step S5, the reference posture can be decided by calculating the reference zmp ($x_{nz}$, $y_{nz}$, $z_{nz}$), the center of gravity height $z_{nw}$, and the waist angle ($0$, $0$, $\gamma_{nw}$) of the robot from the current sole posture (left sole position ($x_{nl}$, $y_{nl}$, $z_{nl}$), left foot yaw angle $\theta_{nl}$, right sole position ($x_{nr}$, $y_{nr}$, $z_{nr}$), and right foot yaw angle $\theta_{nr}$) These values for the reference posture are obtained by the following Expressions (1)-(5).

$$x_{nz} = \frac{x_{nl} + x_{nr}}{2} \tag{1}$$

$$y_{nz} = \frac{y_{nl} + y_{nr}}{2} \tag{2}$$

-continued $$z_{nz} = \frac{z_{nl} + z_{nr}}{2} \tag{3}$$

$$z_{nw} = \sqrt{\left(\frac{x_{dl}+x_{dr}}{2}\right)^2 + \left(\frac{y_{dl}+y_{dr}}{2}\right)^2 + z_{dw}^2 - \left(\frac{x_{nl}+x_{nr}}{2}\right)^2 - \left(\frac{y_{nl}+y_{nr}}{2}\right)^2} \tag{4}$$

$$\gamma_{nw} = \frac{\theta_{nl} + \theta_{nr}}{2} \tag{5}$$

Setting of the reference position expressed by the above Expressions (1) to (5) will be described with reference to the REF in FIG. 5. The xy coordinate of the target zmp is set at the midpoint of the xy coordinate of both feet, the height (z coordinate) of the center of gravity G is set at the height at which $l_f$ does not change, and the angle of the waist W is changed to the midpoint of the orientation of both feet. For example, when the left sole SL is stepped in the lower right direction of FIG. 5, the xy coordinate of the target zmp moves in the lower right direction of FIG. 5 as the feet open, as exemplified by the REF of FIG. 5. The xy coordinate of the center of gravity G is calculated from the target zmp and the whole body posture, and the z coordinate of the center of gravity G is a value to maintain the posture in which the waist is lowered and the legs are bent by the width between the opened feet. Further, since the two feet are opened, the angle of the waist W is set to face a middle direction of the two feet.

Then, the control unit 11 applies (adds) a value obtained by multiplying the value of the reference posture calculated in Step S5 by a displacement from a reference value of the current waist posture of the pilot U (position ($X_{mw}$, $Y_{mw}$, $Z_{mw}$), angle ($A_{mw}$, $B_{mw}$, $\Gamma_{mw}$)) by a conversion constant D taking into consideration the physique difference between the pilot U and the robot 10 to generate the command value (Step S6). The above reference value refers to the initial waist posture of the pilot U described in Step S1. The same processing as in Step S6 is also performed in the stand mode and when there is no mode change from the last time (NO in Step S4) (Step S9). In Step S9, if the value calculated when the mode transitioned to the stand mode is stored as the value of reference posture, the command value can be obtained by referring to the stored value. Thus, the position of the target zmp of the robot 10 in the stand mode ($x_z$, $y_z$, $0$), the height z of the center of gravity G, and the waist angle ($\alpha$, $\beta$, $\gamma$) can be calculated by the following Expressions.

$$x_z = x_{nw} + D(X_{nw} - X_{dw}), \alpha = \alpha_{nw} + D(A_{nw} - A_{dw}),$$

$$y_z = y_{nw} + D(Y_{nw} - Y_{dw}), \beta = \beta_{nw} + D(B_{nw} - B_{dw}),$$

$$z = z_{nw} + D(Z_{nw} - Z_{dw}), \gamma = \gamma_{nw} + D(\Gamma_{nw} - \Gamma_{dw})$$

Based on the position of the target zmp, the x and y coordinates of the position of the center of gravity G can be obtained using the upper body posture and the height z of the center of gravity G as constraints. Moreover, the waist position of the robot can be automatically decided from the information including the position of the center of gravity G (x, y, z).

Further, immediately after the transition to the stand mode, since there is a difference between the target zmp and the waist posture of the robot 10 in the previous mode and the previous values of the robot 10, a sudden displacement during this period may cause a fall. Therefore, after the processing of Step S6, an interpolated value is generated for a specified predetermined transition time between the current posture and the target posture to cause the command value to gently transition (Step S7). Also immediately after the transition to the walk mode, since there is a possibility of falling for the same reason, an interpolated command value is generated in a manner similar to the above case to cause the command value to gently transition (Step S12).

The generation of the command value that controls the posture including the transition time at the time of mode switching will be described with reference to FIG. 6. In FIG. 6, sections consisting of a both-feet standing period operated in the stand mode, a walking period (one step) operated in the walk mode and the both-feet standing period operated in the stand mode are extracted and illustrated. Also in FIG. 6, the upper dashed line shows the waist posture $Y_{nw}$ of the pilot U, the middle solid line shows $y_{nz}$ of the target zmp of the robot 10 generated by the walk calculation, and the lower line shows $y_z$ of the target zmp of the robot 10 used for control. Although only the y direction of zmp is shown in FIG. 6, the same is true in the x direction of zmp and in the waist postures $\alpha$, $\beta$, $\gamma$.

As shown in the lower part of FIG. 6, in the both-feet standing period, the waist posture of the pilot U is controlled to reflect the posture scaled to the size of the robot 11, in the following walking period, it is controlled to become a trajectory of the stable waist posture shown by the target zmp generated by the walking calculation, and in the following both-feet standing period, it is controlled as in the first both-feet standing period. However, since the target zmp cannot maintain the stable posture immediately after the mode is switched, control is performed between points 51 and 52 and between points 53 and 54 in FIG. 6 using an interpolated command value as shown by the chain line. Because of this interpolation, the latest waist posture of the pilot U is always acquired and updated as the target posture during the transition to the stand mode. This makes it possible to achieve a stable state transition without any apparent discomfort.

After the processing of Steps S7, S9, S12, and S13, the control unit 11 reflects the command value to the robot 11, thereby controlling the whole body posture to achieve the command value (Step S8), and the processing is ended. In Step S8, the posture of the upper body can be fixed or controlled based on each joint angle of the pilot U acquired by a motion tracker, etc.

Thus, in this embodiment, when the mode is switched from the walk mode to the stand mode (YES in Step S4), the reference posture information indicating the reference posture of the robot 10 is calculated based on the initial posture information indicating the initial posture of the robot 10 corresponding to the initial posture of the pilot U and the foot position information indicating the current positions of the feet (soles) of the robot 10 (Step S5). Next, in this embodiment, the posture of the robot 10 is controlled based on the pilot posture information and the reference posture information (Steps S6 to S8). Of course, the pilot posture information used here can be current information, that is, up-to-date information. Also, as mentioned above, the pilot posture information can include the position and the angle of the pilot U's waist, and in this case, when the posture of the robot 10 is controlled, the control will be based on the current posture (position and angle) of the pilot U's waist as indicated by the pilot posture information. Also, as mentioned above, the posture information (information indicating a posture such as the reference posture information and the posture of the robot 10 in the stand transition control) of the robot 10 can include the position of the zmp of the robot 10, the height of the center of gravity G, and the angle of the waist.

As described above, according to this embodiment, when the bipedal robot 10 is controlled according to the posture of the pilot U, it is possible to switch between the walk mode and the stand mode seamlessly, and to reflect the waist posture of the pilot U without the risk of falling even if the posture of both legs is changed by walking. Therefore, according to this embodiment, walking stability can be improved when transitioning from walking to standing on both feet.

A supplementary explanation of such effects is provided. An example of the method of manipulating a bipedal robot, it is not limited to the method of this embodiment, includes a method in which a pilot wears a motion tracker or the like to reflect the movement of the whole body. In this case, regarding the actions of the legs, a common method is that the walking instruction is given by a foot pedal or a shoe-type sensor, and a robot uses a command value of the walking instruction to calculate the leg movement and the waist posture to achieve walking without falling and follow the movement of the legs. On the other hand, it is also conceivable to use a method to perform highly expressive actions similar to human movements while standing on both legs by reflecting the waist posture of the pilot. In order to achieve both of the above movement and action, it is necessary to switch between a highly stable waist posture while walking and a highly expressive waist posture while standing on both legs in real time. In this embodiment, it is possible to switch between the walk mode and the stand mode seamlessly, and to reflect the waist posture of the pilot U without the risk of falling even if the posture of both legs is changed by walking, especially during the stand transition. For example, if the feet are opened and the waist height before opening the feet is set to the reference posture, the legs may be fully extended and the movement of the waist from front to back and from side to side cannot not be reflected, but in this embodiment, such a problem can be solved and the mode switching can be performed dynamically and safely.

The control unit 11 in this embodiment can also prevent a target zmp displacement value exceeding a maximum value previously defined for the robot 10 from being reflected to the control of the robot 10. This prevents the movement of the waist position of pilot U from exceeding the stable range of the robot 11. Moreover, a mode for determining whether or not to execute such processing may be provided, and the pilot U may determine whether or not to execute such processing according to the selected mode.

In addition, in Step S7 described above, an example in which the transition time is set for the waist posture displacement when the mode has been changed is given, but as an alternative example, the transition may be performed on a velocity basis. In this case, a target velocity and a target acceleration are set, and the transition is performed to the transition destination command value while the values of target velocity and the target acceleration are satisfied. Thus, when the current waist posture is close to the target waist posture, the transition can be performed in a shorter time.

In addition, the control unit 11 in this embodiment can be configured so that the pilot posture information is not reflected to the control of the robot 10 when the pilot posture information indicates that there is a deviation between the initial posture and the target waist posture by more than a predetermined value. Alternatively, the control unit 21 can be configured in such a way that the output unit 23 does not output to the robot 10 the pilot posture information that indicates that there is a deviation between the initial posture and the target waist posture by more than a predetermined value.

For example, an abnormal value may be input to the waist posture due to a measurement error in the sensor group 22. If such waist posture including an abnormal value is employed as a command, there is a high possibility that the robot may fall. Thus, if an input command value that deviates from the initial posture by more than a certain amount (out of a specified range) is input, such an input value is detected, and the processing is made to wait until the input value returns within a certain range. In addition, a mode for determining whether or not to execute such processing may be provided, and it may be determined whether or not to execute such processing according to the mode selected by the pilot U. The mode to be selected may include the following fixed mode and transition mode. In the fixed mode, if a value outside the specified range is input, the robot 10 detects it, discards the command value, and fixes it to the command value just before the value goes outside the specified range. In the transition mode, if the value returns within the specified range, it detects the return, calculates the target posture from the command value, and generates an interpolation value between the current posture and the target posture for any transition time to cause the command value to gently transition. Thus, even if the returned command value deviates from the command value just before it goes out of the specified range, it can be restored stably and without any apparent discomfort.

The explanation is also given on the assumption that the calculation of the control value (command value) controlling the posture of the robot 10 is performed by the control unit 11 on the robot 10 side, but the present disclosure is not limited to this. For example, the manipulation apparatus 20 worn by the pilot U may calculate the above control value, or a manipulation apparatus for relaying may be provided separately and this manipulation apparatus may calculate the above control value. That is, the calculation of the reference posture information or all of the controls described as features of the control unit 11 may be executed by the control unit 21 on the manipulation apparatus 20 side via the output unit 23 and the input unit 13, or they may be executed by the manipulation apparatus for relaying.

In addition, both of the aforementioned robot 10 and manipulation apparatus can be configured to have a hardware configuration that includes, for example, a processor, a memory, and a communication interface. These apparatuses are implemented by the processor reading and executing a program stored in the memory. The program includes instructions (or software codes) that, when loaded into a computer, cause the computer to perform one or more of the functions described in the embodiments. The program may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disc (DVD), Blu-ray disc or other optical disc storage, magnetic cassettes, magnetic tape, magnetic disk storage or other magnetic storage devices. The program may be transmitted on a transitory computer readable medium or a communication medium. By way of example, and not limitation, transitory computer readable media or communication media can include electrical, optical, acoustical, or other form of propagated signals.

It should be noted that the present disclosure is not limited to the above embodiment, and can be changed as appropriate without departing from the scope. For example, the robot control system is not limited to the configuration shown in

12

FIG. 1, but can be constructed as a system in which functions are distributed or aggregated as appropriate. Furthermore, the bipedal robot 10 and the manipulation apparatus 20 sensor group are not limited to the appearances exemplified in FIG. 2. For example, the bipedal robot may be a robot consisting of only a lower body without the head or upper body.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A robot control method comprising:

inputting pilot posture information indicating a current posture of a pilot; and executing action control of a bipedal robot capable of switching modes between a walk mode corresponding to a swing phase and a stand mode corresponding to a stance phase based on the pilot posture information, wherein the action control includes stand transition control, the stand transition control including calculating reference posture information indicating a reference posture of the bipedal robot based on initial posture information indicating an initial posture of the bipedal robot corresponding to an initial posture of the pilot established during an initial calibration phase prior to any walking operation and foot position information indicating current foot positions of the bipedal robot, and controlling a change in posture of the bipedal robot based on the pilot posture information and the calculated reference posture information in response to switching from the walk mode to the stand mode, the pilot posture information includes a position and an angle of a waist of the pilot, the reference posture information, the initial posture information, and information indicating the posture of the bipedal robot in the stand transition control include a position of a zero moment point of the bipedal robot, a height of a center of gravity of the bipedal robot, and an angle of the bipedal robot's waist, the stand transition control further comprises generating command values using both the calculated reference posture information and the initial posture information established during the initial calibration phase, and both the initial posture information of the bipedal robot and the initial posture of the pilot from the initial calibration phase serve as persistent baselines that are combined with the pilot posture information throughout operation.

2. A robot control system comprising:

a processor configured to:

receive pilot posture information indicating a current posture of a pilot; and execute action control of a bipedal robot capable of switching modes between a walk mode corresponding to a swing phase and a stand mode corresponding to a stance phase based on the pilot posture information, wherein the processor is configured to calculate reference posture information indicating a reference posture of the bipedal robot based on initial posture information indicating an initial posture of the bipedal robot corresponding to an initial posture of the pilot established during an initial calibration phase prior to any walking operation and foot position information indicating current foot positions of the bipedal robot, and control a change in posture of the bipedal robot based on the pilot posture information and the calculated reference posture information in response to switching from the walk mode to the stand mode, the pilot posture information includes a position and an angle of a waist of the pilot, the reference posture information, the initial posture information, and information indicating the posture of the bipedal robot in the stand transition control include a position of a zero moment point of the bipedal robot, a height of a center of gravity of the bipedal robot, and an angle of the bipedal robot's waist, the stand transition control further comprises generating command values using both the calculated reference posture information and the initial posture information established during the initial calibration phase, and both the initial posture information of the bipedal robot and the initial posture of the pilot from the initial calibration phase serve as persistent baselines that are combined with the pilot posture information throughout operation.

3. A non-transitory computer readable medium storing a program for causing a computer to execute robot control comprising:

inputting pilot posture information indicating a current posture of a pilot; and executing action control of a bipedal robot capable of switching modes between a walk mode corresponding to a swing phase and a stand mode corresponding to a stance phase based on the pilot posture information, wherein the action control includes stand transition control, the stand transition control including calculating reference posture information indicating a reference posture of the bipedal robot based on initial posture information indicating an initial posture of the bipedal robot corresponding to an initial posture of the pilot established during an initial calibration phase prior to any walking operation and foot position information indicating current foot positions of the bipedal robot, and controlling a change in posture of the bipedal robot based on the pilot posture information and the calculated reference posture information in response to switching from the walk mode to the stand mode, the pilot posture information includes a position and an angle of a waist of the pilot, the reference posture information, the initial posture information, and information indicating the posture of the bipedal robot in the stand transition control, include a position of a zero moment point of the bipedal robot, a height of a center of gravity of the bipedal robot, and an angle of the bipedal robot's waist, the stand transition control further comprises generating command values using both the calculated reference posture information and the initial posture information established during the initial calibration phase, and both the initial posture information of the bipedal robot and the initial posture of the pilot from the initial calibration phase serve as persistent baselines that are combined with the pilot posture information throughout operation.

* * * * *